(12) United States Patent
Peng (10) Patent No.: US 9,802,389 B2
(45) Date of Patent: Oct. 31, 2017

(54) PURE WOODEN LAMINATED BOARD AND AN ALUMINIUM-WOOD COMPOSITE LAMINATED BOARD DEVICE WITH APPLICATION OF THE PURE WOODEN LAMINATED BOARD

(71) Applicant: Zhijun Peng, Guangdong Province (CN)

(72) Inventor: Zhijun Peng, Guangdong Province (CN)

( * ) Notice: Subject to any disclaimer, the term of this patent is extended or adjusted under 35 U.S.C. 154(b) by 155 days.

(21) Appl. No.: 14/819,435

(22) Filed: Aug. 6, 2015

(65) Prior Publication Data

US 2017/0036422 A1    Feb. 9, 2017

(51) Int. Cl.
| | |
|---|---|
| *B32B 3/14* | (2006.01) |
| *B32B 15/10* | (2006.01) |
| *B32B 7/12* | (2006.01) |
| *B32B 1/00* | (2006.01) |
| *B32B 3/06* | (2006.01) |
| *B32B 7/08* | (2006.01) |
| *B32B 15/20* | (2006.01) |
| *B32B 21/14* | (2006.01) |
| *E04C 1/00* | (2006.01) |

(52) U.S. Cl.
CPC ............. *B32B 15/10* (2013.01); *B32B 1/00* (2013.01); *B32B 3/06* (2013.01); *B32B 7/08* (2013.01); *B32B 7/12* (2013.01); *B32B 15/20* (2013.01); *B32B 21/14* (2013.01); *E04C 1/00* (2013.01); *B32B 2307/546* (2013.01); *B32B 2307/714* (2013.01); *B32B 2307/7145* (2013.01); *B32B 2419/00* (2013.01); *B32B 2451/00* (2013.01); *B32B 2479/00* (2013.01); *B32B 2607/00* (2013.01)

(58) Field of Classification Search
CPC ............... Y10T 428/18; Y10T 428/183; Y10T 428/187; Y10T 428/192; B32B 3/14; E01C 5/14
USPC ......................................................... 428/223
See application file for complete search history.

(56) References Cited

U.S. PATENT DOCUMENTS 6,588,161 B2 *  7/2003  Smith ..................... E04B 2/702
                                                      52/223.7

* cited by examiner

*Primary Examiner* — Alexander Thomas (57) ABSTRACT

A pure wooden laminated board and an aluminum-wood composite laminated board device with application of the pure wooden laminated board, having a plurality of pure wooden boards, a first pure wooden side board, a second pure wooden side board, and a plurality of screws and nuts. Each of the pure wooden boards has a laminating side. The laminating sides are each provided with an expansion joint and a plurality of screw holes, and adhesive is applied to the laminating sides; each of the pure wooden boards is aligned and laminated to form into an integrated pure wooden laminated board assembly. The screws are engaged with the respective screw holes of each of the pure wooden boards, and the screws are fastened by the nuts; each of the pure wooden side boards is provided on the respective laminating sides at two sides of the pure wooden laminated board assembly.

8 Claims, 9 Drawing Sheets

PURE WOODEN LAMINATED BOARD AND AN ALUMINIUM-WOOD COMPOSITE LAMINATED BOARD DEVICE WITH APPLICATION OF THE PURE WOODEN LAMINATED BOARD

BACKGROUND OF THE INVENTION

The present invention relates to furniture boards or building boards or architectural decorative boards, and more particularly pertains to an aluminium-wood composite board.

At present, solid wood boards are often used for producing different pieces of furniture in the market or are being applied in everyday life. When used over long periods of time, devices produced in this way are prone to problems such as cracking and warping. Moreover, when a larger integrated wooden board is used for production, mass consumption of large wood of long-lived trees is required, causing severe damage to the natural environment. Meanwhile, devices made of solid wood generally have weak structural strength and disadvantages such as being susceptible to warping, mould growth, damages by water, sunlight and pests, as well as poor durability.

BRIEF SUMMARY OF THE INVENTION

An object of the present invention is to provide a pure wooden laminated board which has a simple structure and is easy to implement, and effectively prevents unfavorable conditions such as materials cracking and warping caused by thermal expansion and contraction of pure woods, thus rendering the wooden board products more aesthetically pleasing in appearance, more environmentally-friendly and more durable. On this basis, a further object of the present invention is to provide an aluminium-wood composite laminated board device with the application of the pure wooden laminated board technology. The aluminium-wood composite laminated board device have all technical advantages of the pure wooden laminated board as aforesaid, and after combination it also has advantages such as being resistant to warping, corrosion, mould, cracking, water, sunlight, peeling, discoloration, pests and water, as well as being safe and durable, low carbon emission, environmentally friendly, convenient to assemble, and simple in assembly structure.

To achieve this, the present invention adopts the following technical proposal:

A pure wooden laminated board, characterized in that it comprises a plurality of pure wooden boards, a first pure wooden side board, a second pure wooden side board, and a plurality of screws and nuts; wherein each of the pure wooden boards has a laminating side; the laminating sides are each provided with an expansion joint and a plurality of screw holes, and adhesive is applied to the laminating sides; each of the pure wooden boards is aligned and laminated to form into an integrated pure wooden laminated board assembly; the screws are engaged with the respective screw holes of each of the pure wooden boards, and two ends of the screws are fastened and locked by the respective nuts; the first pure wooden side board and the second pure wooden side board are provided on the laminating sides at two sides of the pure wooden laminated board assembly respectively, so that ends of the screws and the nuts are concealed inside the laminated board.

The pure wooden board has an elongated, curved, squared, rounded, oval or rhombic shape.

To achieve further objects, the present invention adopts two proposals, namely:

First, an aluminium-wood composite laminated board device with application of the aforesaid pure wooden laminated board, characterized in that it comprises a pure wooden laminated board assembly and an aluminium alloy baseplate; wherein the pure wooden laminated board assembly comprises a plurality of pure wooden boards, a first pure wooden side board, a second pure wooden side board, and a plurality of screws and nuts. Each of the pure wooden boards has a laminating side. The laminating sides are each provided with an expansion joint and a plurality of screw holes, and adhesive is applied to the laminating sides. Each of the pure wooden boards is aligned and laminated to form into an integrated pure wooden laminated board assembly. The screws are engaged with the respective screw holes of each of the pure wooden boards, and two ends of the screws are fastened and locked by the respective nuts. The first pure wooden side board and the second pure wooden side board are provided on the laminating sides at two sides of the pure wooden laminated board assembly respectively, so that ends of the screws and the nuts are concealed inside the laminated board. Two sides of the aluminium alloy baseplate are respectively provided with a male connector portion and a female connector portion which can be engaged with each other. The bottom of the pure wooden laminated board assembly is fixedly covered on the aluminium alloy baseplate after adhesive is applied. A male connector head and a female connector head which can be engaged with each other are provided at two ends of the pure wooden laminated board assembly respectively.

Second, an aluminium-wood composite laminated board device with application of the aforesaid pure wooden laminated board, characterized in that it comprises a plurality of pure wooden laminated board assemblies, an aluminium alloy male baseplate and an aluminium alloy female baseplate; wherein the pure wooden laminated board assemblies each comprises a plurality of pure wooden boards, a first pure wooden side board, a second pure wooden side board, and a plurality of screws and nuts. Each of the pure wooden boards has a laminating side. The laminating sides are each provided with an expansion joint and a plurality of screw holes, and adhesive is applied to the laminating sides. Each of the pure wooden boards is aligned and laminated to form into an integrated pure wooden laminated board assembly. The screws are engaged with the respective screw holes of each of the pure wooden boards, and the two ends of the screws are fastened and locked by the respective nuts. The first pure wooden side board and the second pure wooden side board are provided on the laminating sides at two sides of the pure wooden laminated board assembly respectively, so that ends of the screws and the nuts are concealed inside the laminated board. Two sides of the aluminium alloy male baseplate are respectively provided with a male connector portion and a female joint portion. Two sides of the aluminium alloy female baseplate are respectively provided with a female connector portion and a male joint portion. The male connector portion of the aluminium alloy male baseplate is engaged with the female connector portion of the adjacent aluminium alloy female baseplate. The female joint portion of the aluminium alloy male baseplate is engaged with the male joint portion of the adjacent aluminium alloy female baseplate. The pure wooden laminated board assemblies are fixedly covered on the aluminium alloy male baseplate and the aluminium alloy female baseplate after adhesive is applied. A male connector head and a female connector head which can be engaged with each other are provided at two ends of each of the pure wooden laminated board assemblies respectively.

The present invention has the following beneficial effects:

(1) With the expansion joint structure provided on the laminating sides of the pure wooden boards, the entire piece of laminated board obtained after processing will not expand, arch or crack due to climatic change, thereby better ensuring the quality and appearance of the entire pure wooden laminated board, and ensuring a long lifespan.

(2) By means of applying wood adhesive to the laminating sides of each of the pure wooden boards, the pure wooden battens can be laminated together more securely, neatly and perfectly.

(3) By means of locking each of the pure wooden boards of the entire piece of laminated board with screws and nuts, on one hand the structural strength of the entire piece of laminated board can be greatly enhanced, on the other hand the reliability and security of the lamination of each of the pure wooden boards are better ensured. Expansion, warping and cracking can be completely prevented, and the quality of the entire piece of laminated board can be further ensured.

(4) By providing the first pure wooden side board and the second pure wooden side board on the laminating sides at two sides of the pure wooden laminated board assembly respectively, and by concealing the screw ends and the nuts at the screw ends, aesthetic appearance of the pure wooden laminated board products can be greatly improved. It also ensures that metal screws and nuts are protected from moisture in the natural environment, thus maximising the lifespan of the pure wooden laminated board products.

(5) The aluminium-wood composite laminated board device of the present invention does not only have all the technical advantages of the pure wooden laminated board as aforesaid, after combination, it also has advantages such as being resistant to warping, corrosion, mould, cracking, water, sunlight, peeling, discoloration, pests and water, as well as being safe and durable, low carbon emission, environmentally friendly, convenient to assemble, and simple in assembly structure.

(6) The screws and nuts hinder the thermal expansion force of woods during thermal expansion of the woods of the present invention. The expansion joint also reduces the thermal expansion force. While thermal expansion of woods does not occur, contraction is less likely to occur, thus the present invention is less susceptible to cracking and warping. Meanwhile, applying adhesive to the bottom of the pure wooden laminated board and locking the aluminium plate with the male and female connectors together forms the aluminium-wood composite laminated board which is resistant to warping, corrosion, mould, cracking, water, sunlight, peeling, discoloration, pests and water, as well as being safe and durable and low carbon emission.

(7) The pure wooden laminated board and the aluminium-wood composite laminated board device with application of the pure wooden laminated board can be widely applied to the furniture industry. For example, they can be applied to household furniture (such as living room sofas, restaurants, bedrooms, study rooms, kitchens, windows and doors, bathrooms etc.), office furniture (such as office desks, office chairs, folding screens, booth tables, document cabinets, etc.) as well as hotel furniture (such as dining tables, dining chairs, beds, etc.). They can also be applied broadly to building materials and renovation, such as cooled floors, heated floors, wallboards, wooden rooms, walls, staircases, floorings, ceilings, false ceilings, renovation of houses and walls, furniture renovation, as well as solving wall renovation problems, etc. Meanwhile, the present invention can be applied to trains, planes, cars, ships and so forth. The present invention is easy to build large curved structure, and is difficult to crack and low in costs.

DETAILED DESCRIPTION OF THE INVENTION

Embodiment 1

Figure 1:
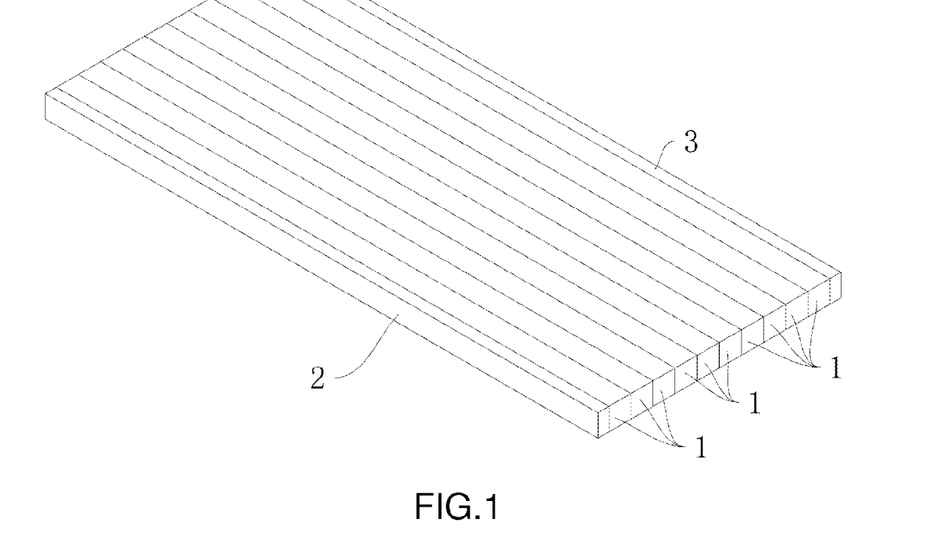
FIG. 1 illustrates a first structural view of a square-shaped pure wooden board of the present invention.
Figure 2:
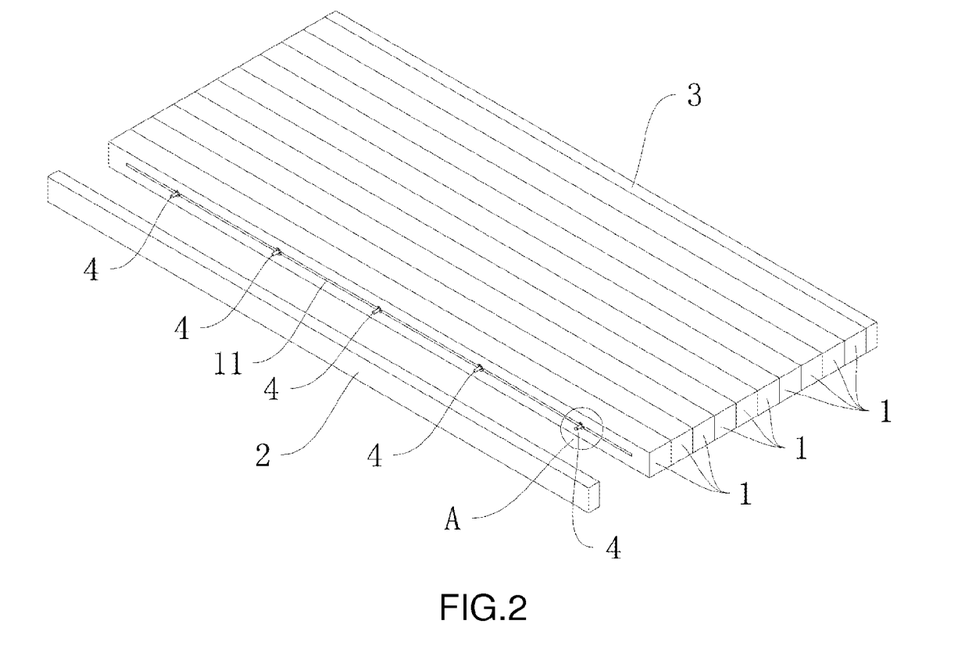
FIG. 2 illustrates a second structural view of a square-shaped pure wooden board of the present invention.
Figure 3:
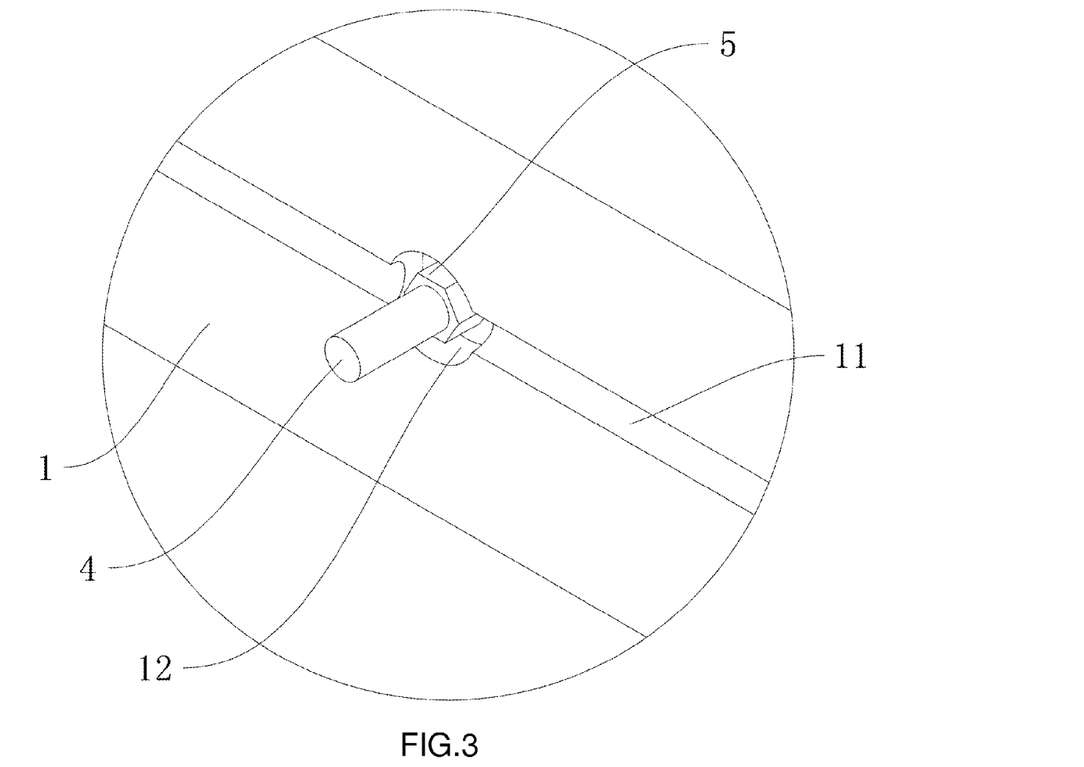
FIG. 3 illustrates an enlarged structural view of part A in FIG. 2 of the present invention.

As shown in FIGS. 1 to 3, a pure wooden laminated board of the present invention comprises a plurality of pure wooden boards 1, a first pure wooden side board 2, a second pure wooden side board 3, a plurality of screws 4 and a plurality of nuts 5; wherein each of the pure wooden boards 1 has a laminating side. The laminating sides are each provided with an expansion joint 11 and a plurality of screw holes, and adhesive is applied to the laminating sides; each of the pure wooden boards 1 is aligned and laminated to form an integrated pure wooden laminated board assembly 10. The screw 4 are engaged with the respective screw holes of each of the pure wooden boards 1, and two ends of the screws 4 are fastened and locked by the respective nuts 5; the first pure wooden side board 2 and the second pure wooden side board 3 are provided on the laminating sides at two sides of the pure wooden laminated board assembly 10 respectively, so that ends of the screws 4 and the nuts 5 are concealed inside the laminated board. As shown in FIG. 3, during assembly or production of the pure wooden laminated board, side walls of two outermost pure wooden boards 2 may be provided with countersunk holes 12 at positions of the screw holes of the screws 4 if required for embedding and concealing the nuts 5.

The expansion joint structure provided among the pure wooden boards can effectively protect the pure wooden laminated board products from the effects of climatic changes and thus they will not expand, arch, contract or crack, thereby better ensuring the quality, appearance and lifespan of the pure wooden laminated boards. Wood adhesive is applied to the laminating sides of each of the pure wooden boards, so that the pure wooden boards can be laminated together more securely, neatly and perfectly. By using screws and nuts to lock each of the pure wooden boards together, the reliability and security of each of the pure wooden laminated boards are better ensured. Expansion, warping and cracking can be completely prevented, and the quality of the pure wooden laminated board products can be ensured. With the first pure wooden side board 2 and the second pure wooden side board 3, the two ends of the screw 4 and the nuts 5 at both ends of the screw 4 can be concealed, thereby greatly improving the aesthetic appearance of the pure wooden laminated board products. It also ensures that the metal screws 4 and nuts 5 are protected from moisture in the natural environment, thus maximising the lifespan of the pure wooden laminated board products. During the production of the pure wooden laminated boards, generally a coat of paint is sprayed so that the pure wooden boards are isolated from air, and moisture and heat are prevented from penetrating the pure wooden laminated boards, thus the pure wooden laminated boards are resistant to corrosion and pests from external environment. The lifespan of the pure wooden laminated boards is increased.

As shown in FIGS. 1 to 5, the pure wooden board 1 has an elongated, curved, squared, rounded, oval or rhombic shape.

Figure 4:
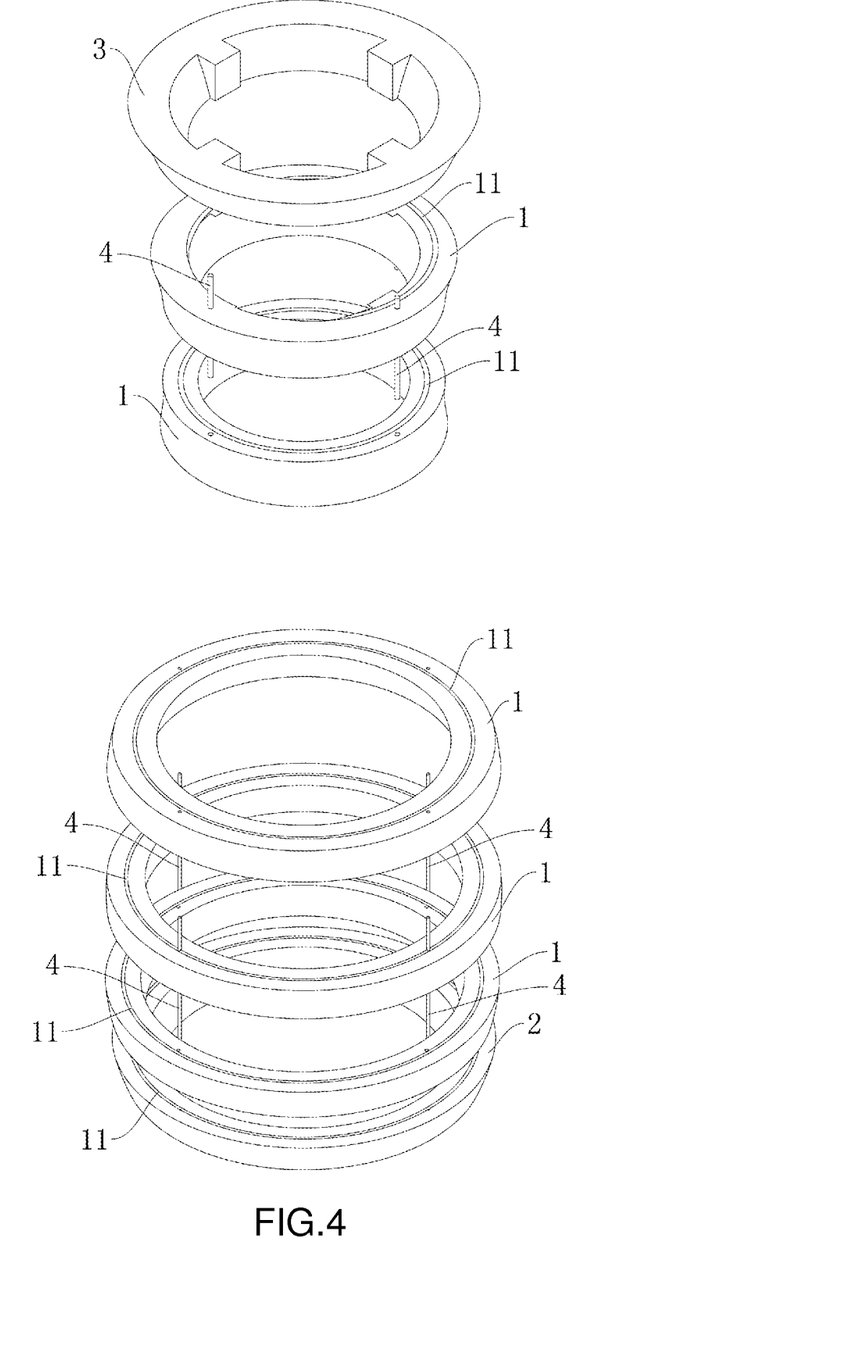
FIG. 4 illustrates a structural view of a rounded-shaped pure wooden board of the present invention.
Figure 5:
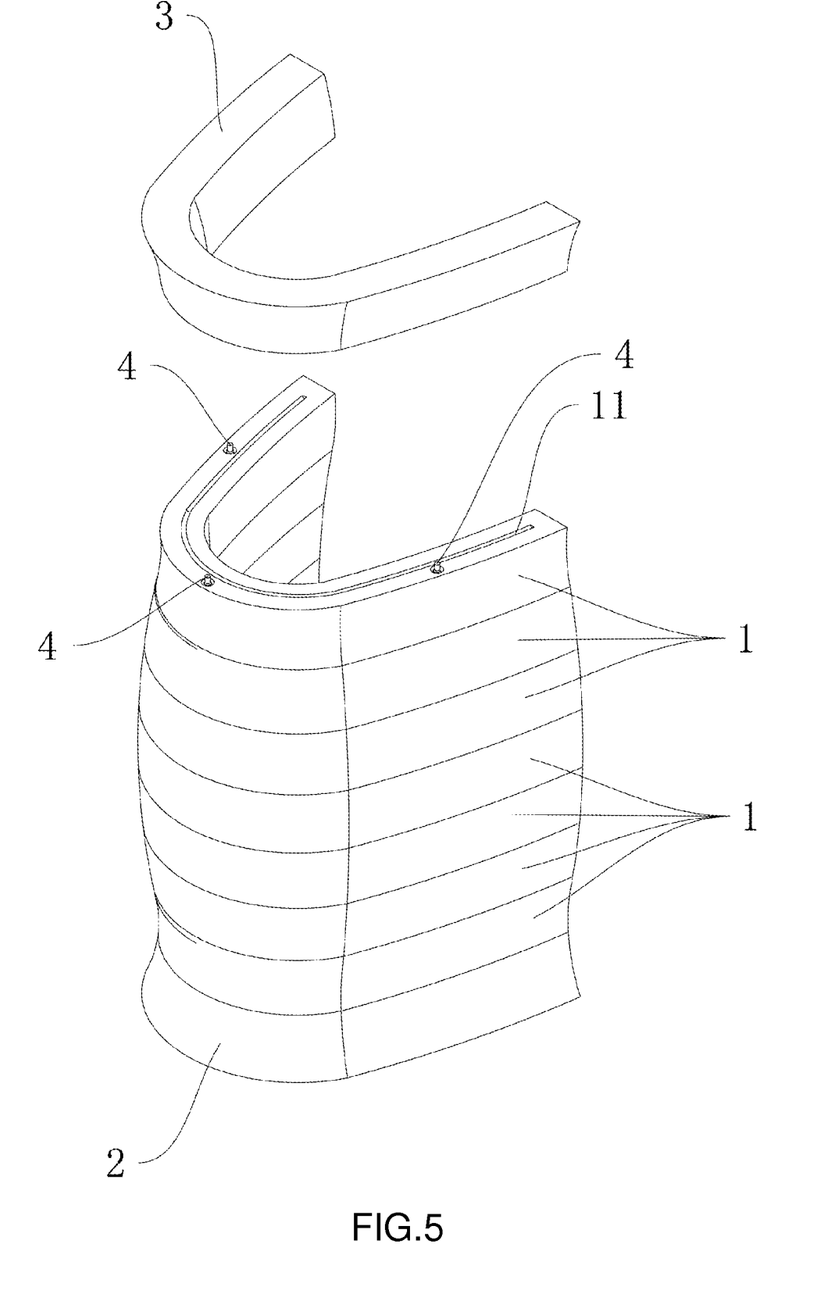
FIG. 5 illustrates a structural view of a curved-shaped pure wooden board of the present invention.

With the aforesaid technical means of laminating wood strips, the present invention can easily build all kinds of woodwork in a small curved shape, large curved shape, rounded shape or oval shape, etc., as shown in FIGS. 4 and 5.

Embodiment 2

Embodiment 2 mainly discloses an aluminium-wood composite laminated board device with the application of the pure wooden laminated board in Embodiment 1. Thus, in addition to the disclosure in Embodiment 1, Embodiment 2 also contains technical features different from those in Embodiment 1. The features of Embodiment 2 which are the same as those in Embodiment 1 are not repeated herein to avoid lengthy descriptions. Specifically, Embodiment 2 comprises a pure wooden laminated board assembly 10 and an aluminium alloy baseplate 6.

Figure 6:
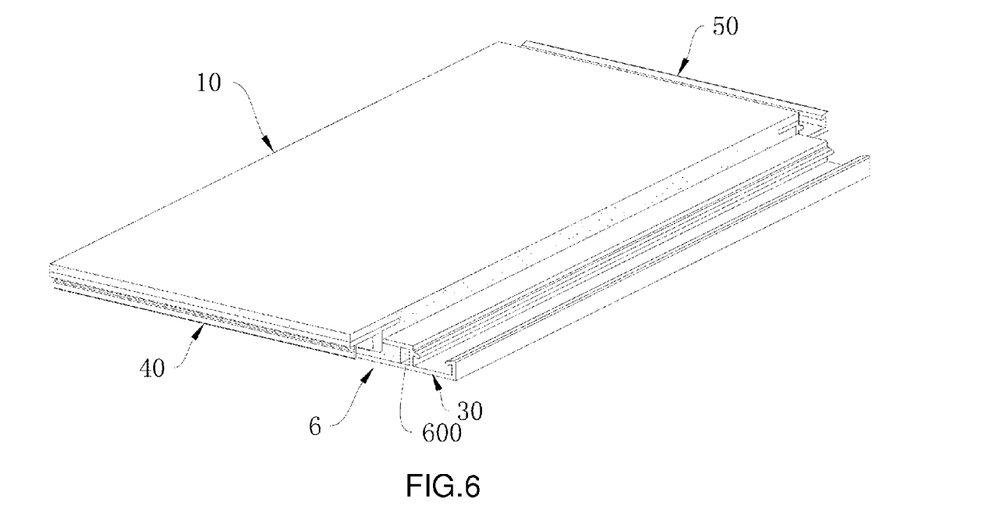
FIG. 6 illustrates a structural view of a first embodiment of the aluminium-wood composite laminated board device of the present invention.
Figure 7:
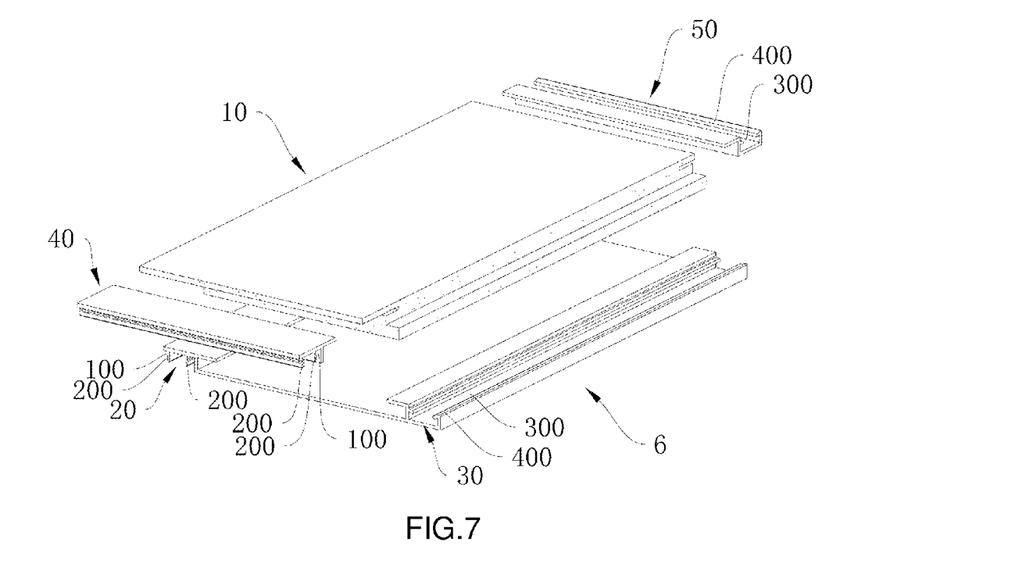
FIG. 7 illustrates an exploded structural view of the first embodiment of the aluminium-wood composite laminated board device of the present invention.

As shown in FIGS. 6 and 7, two sides of the aluminium alloy baseplate 6 are respectively provided with a male connector portion 20 and a female connector portion 30 which can be engaged with each other. The pure wooden laminated board assembly 10 is fixedly covered on the aluminium alloy baseplate 6. Adhesive is applied on contact surfaces between the pure wooden laminated board assembly 10 and the aluminium alloy baseplate 6 to ensure the two are connected well. As shown in FIG. 7, a male connector head 40 and a female connector head 50 which can be engaged with each other are provided at two ends of the pure wooden laminated board assembly 10 respectively. With the male connector head 40 and the female connector head 50, it is convenient to laminate ends of the aluminium-wood composite laminated board devices. Laminating the pure wooden laminated board assembly 10 and the aluminium alloy baseplate 6 together can not only ensure the decorative effect of pure wood, but also provide the aluminium-wood composite laminated board device with a higher structural strength.

Figure 11:
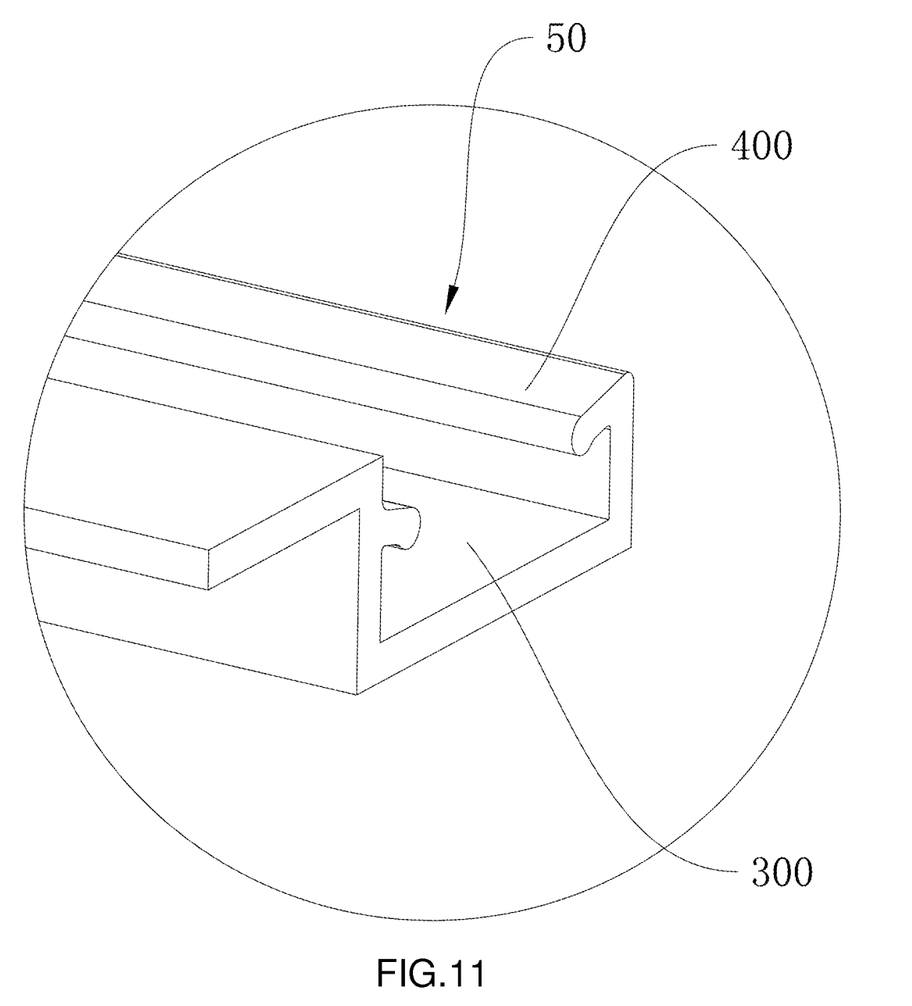
FIG. 11 illustrates an enlarged structural view of part C in FIG. 9 of the present invention.

To further simplify the connection structure of the present invention, as shown in FIGS. 7 and 11, the male connector head 40 and the male connector portion 20 respectively comprise a notch 100 and two assembly strips 200 provided in the notch 100; the female connector head 50 and the female connector portion 30 respectively comprise an assembly slot 300 and an assembly portion 400 provided in the assembly slot 300.

As shown in FIG. 6, an expansion joint 600 is provided between the pure wooden laminated board assembly 10 and the aluminium alloy baseplate 6. The expansion joint 600 is intended to leave enough thermal expansion space for the pure wooden laminated board assembly 10, thereby preventing it from cracking during thermal expansion. Meanwhile, adhesive is applied on contact surfaces between the pure wooden laminated board assembly 10 and the aluminium alloy baseplate 6. By means of the adhesive, the connection between the pure wooden laminated board assembly 10 and the aluminium alloy baseplate 6 can be further enhanced.

Embodiment 3

Figure 8:
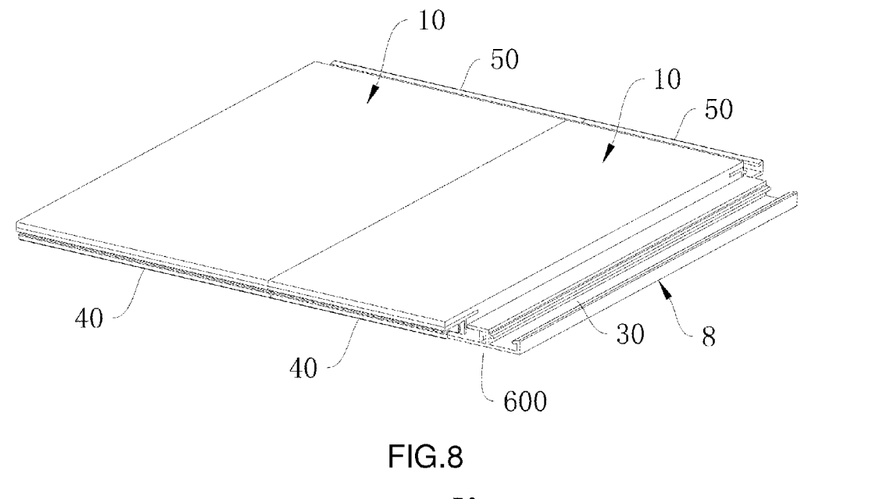
FIG. 8 illustrates a structural view of a second embodiment of the aluminium-wood composite laminated board device of the present invention.
Figure 9:
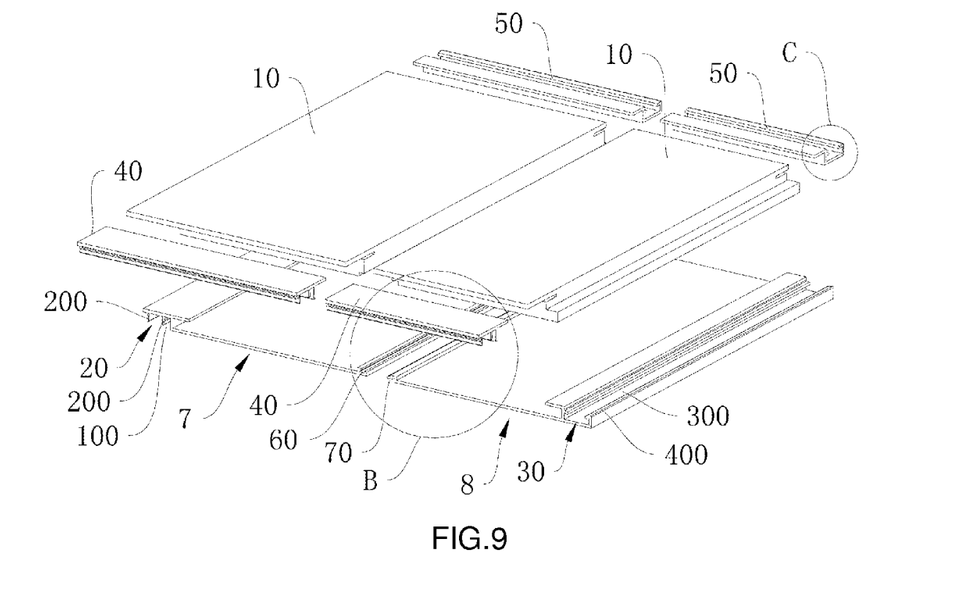
FIG. 9 illustrates an exploded structural view of the second embodiment of the aluminium-wood composite laminated board device of the present invention.

Embodiment 3 mainly discloses an aluminium-wood composite laminated board device with the application of the pure wooden laminated board in Embodiment 1, and is slightly different from the proposal in Embodiment 2. Embodiment 3 can be seen as an extension or expansion of the proposal in Embodiment 2. The features of Embodiment 3 which are the same as those in Embodiment 1 or Embodiment 2 are not repeated herein to avoid lengthy descriptions. Specifically, as shown in FIGS. 8 and 9, Embodiment 3 comprises a plurality of pure wooden laminated board assemblies 10, an aluminium alloy male baseplate 7 and an aluminium alloy female baseplate 8.

Two sides of the aluminium alloy male baseplate 7 are respectively provided with a male connector portion 20 and a female joint portion 60. Two sides of the aluminium alloy female baseplate 8 are respectively provided with a female connector portion 30 and a male joint portion 70. The male connector portion 20 of the aluminium alloy male baseplate 7 is engaged with the female connector portion 30 of the adjacent aluminium alloy female baseplate 8. The female joint portion 60 of the aluminium alloy male baseplate 7 is engaged with the male joint portion 70 of the adjacent aluminium alloy female baseplate 8. The pure wooden laminated board assemblies 10 are fixedly covered on the aluminium alloy male baseplate 7 and the aluminium alloy female baseplate 8. Generally, adhesive is applied on contact surfaces between the pure wooden laminated board assemblies 10 and the aluminium alloy male baseplate 7 and between the pure wooden laminated board assemblies 10 and the aluminium alloy female baseplate 8 to further enhance the connection between metal and wood. As shown in FIGS. 8 and 9, a male connector head 40 and a female connector head 50 which can be engaged with each other are provided at two ends of each of the pure wooden laminated board assemblies 10. With the male connector head 40 and the female connector head 50, it is convenient to laminate ends of the aluminium-wood composite laminated board devices.

Figure 12:
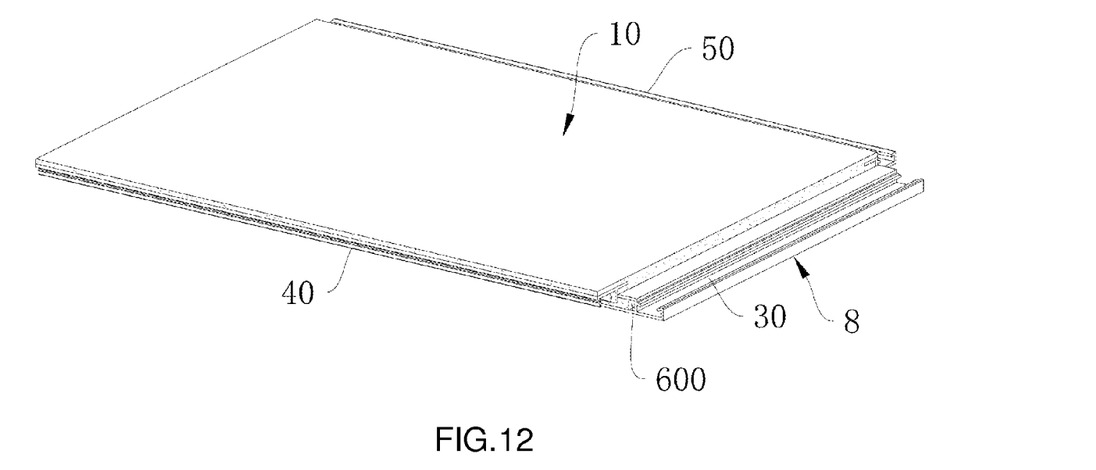
FIG. 12 illustrates a structural view of a third embodiment of the aluminium-wood composite laminated board device of the present invention.
Figure 13:
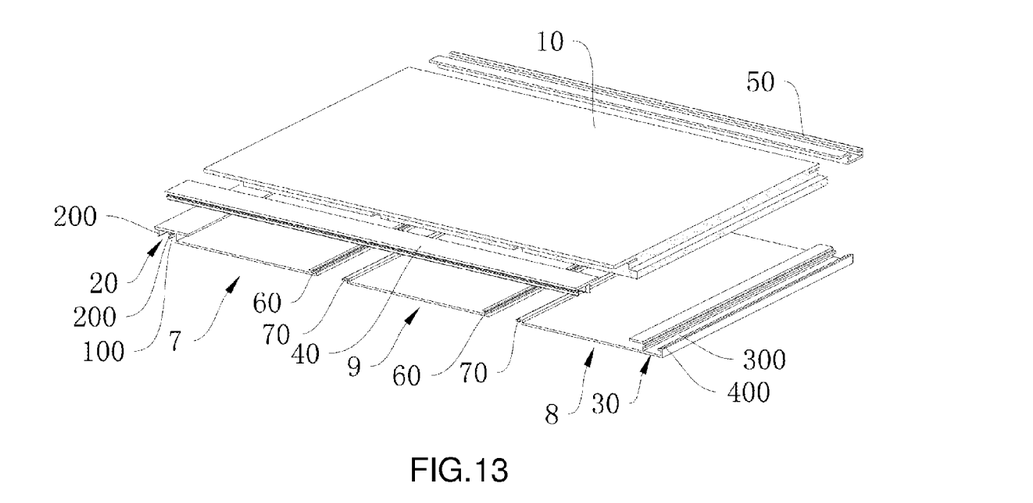
FIG. 13 illustrates an exploded structural view of the third embodiment of the aluminium-wood composite laminated board device of the present invention.

To further increase the flexibility of the present invention in application, as shown in FIGS. 12 and 13, at least one aluminium alloy expansion baseplate 9 is provided between the female joint portion 60 of the aluminium alloy male baseplate 7 and the male joint portion 70 of the adjacent aluminium alloy female baseplate 8. A male joint portion 70 is provided at one side of the aluminium alloy expansion baseplate 9, and a female joint portion 60 is provided at another side of the aluminium alloy expansion baseplate 9. The male joint portion 70 at one side of the aluminium alloy expansion baseplate 9 and the female joint portion 60 of the aluminium alloy male baseplate 7 are engaged with each other. The female joint portion 60 at one side of the aluminium alloy expansion baseplate 9 and the male joint portion 70 of the aluminium alloy female baseplate 8 are engaged with each other. The pure wooden laminated board assemblies 10 are fixedly covered on the aluminium alloy expansion baseplate 9, and adhesive is applied on contact surfaces between the pure wooden laminated board assemblies 10 and the aluminium alloy expansion baseplate 9.

Figure 10:
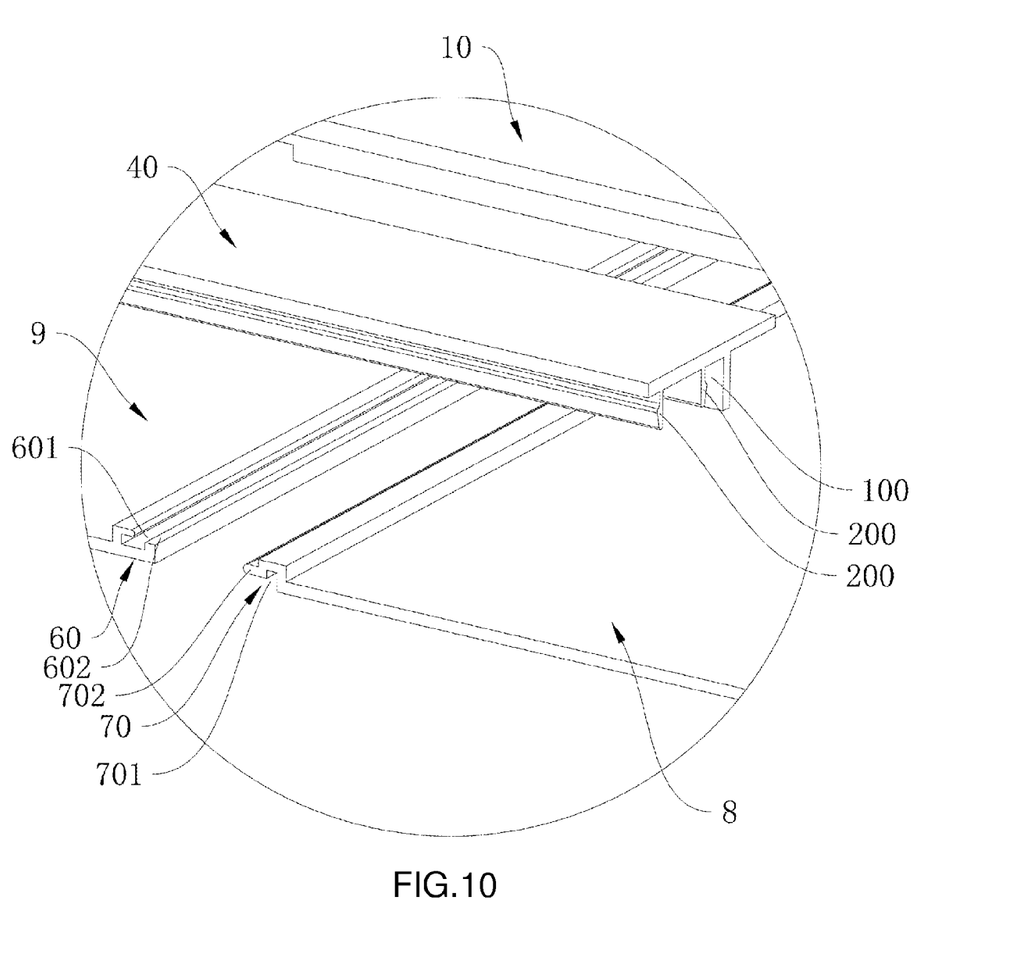
FIG. 10 illustrates an enlarged structural view of part B in FIG. 9 of the present invention.

As shown in FIG. 10, the male joint portion 70 comprises a slot 701 and a jointing strip 702 provided beside the slot 701; the female joint portion 60 comprises a jointing slot 601 and a jointing portion 602 provided beside the jointing slot 601.

It should be particularly mentioned herein that the pure wooden laminated board assembly 10 of the present invention can be an entire piece of laminated board assembly fixedly covered on the aluminium alloy male baseplate 7 and the aluminium alloy female baseplate 8, or comprise a plurality of small pieces of pure wooden laminated board assemblies 10 which are laminated together after fixedly covered on the aluminium alloy male baseplate 7 and the aluminium alloy female baseplate 8 respectively.

What is claimed is:

1. An aluminium-wood composite laminated board device with application of a pure wooden laminated board,
wherein the aluminium-wood composite laminated board device comprises the pure wooden laminated board and an aluminium alloy baseplate (6); wherein the pure wooden laminated board comprises a plurality of pure wooden boards (1), a first pure wooden side board (2), a second pure wooden side board (3), and a plurality of screws (4) and nuts (5); each of the pure wooden boards (1) has laminating sides; the laminating sides of each of the pure wooden boards (1) are each provided with an expansion joint (11) and a plurality of screw holes, and adhesive is applied to the laminating sides; the pure wooden boards (1) are aligned and laminated to form into an integrated pure wooden laminated board assembly (10); the screws (4) are engaged with the respective screw holes of each of the pure wooden boards (1), and two ends of the screws (4) are fastened and locked by the respective nuts (5); the first pure wooden side board (2) and the second pure wooden side board (3) are provided on the laminating sides at two sides of the pure wooden laminated board assembly (10) respectively, so that ends of the screws (4) and the nuts (5) are concealed inside the pure wooden laminated board; two sides of the aluminium alloy baseplate (6) are respectively provided with a male connector portion (20) and a female connector portion (30) which can be engaged with each other; the pure wooden laminated board is fixedly covered on the aluminium alloy baseplate (6); a male connector head (40) and a female connector head (50) which can be engaged with each other are provided at two ends of the pure wooden laminated board respectively.

2. The aluminium-wood composite laminated board device as in claim 1, characterized in that the male connector head (40) and the male connector portion (20) respectively comprise a notch (100) and two assembly strips (200) provided in the notch (100); the female connector head (50) and the female connector portion (30) respectively comprise an assembly slot (300) and an assembly portion (400) provided in the assembly slot (300).

3. The aluminium-wood composite laminated board device as in claim 1, characterized in that an expansion joint (600) is provided between the pure wooden laminated board and the aluminium alloy baseplate (6), and adhesive is applied on contact surfaces between the pure wooden laminated board and the aluminium alloy baseplate (6).

4. An aluminium-wood composite laminated board device with application of pure wooden laminated boards, wherein the aluminium-wood composite laminated board device comprises a plurality of the pure wooden laminated boards, an aluminium alloy male baseplate (7) and an aluminium alloy female baseplate (8); wherein each of the pure wooden laminated boards comprises a plurality of pure wooden boards (1), a first pure wooden side board (2), a second pure wooden side board (3), and a plurality of screws (4) and nuts (5); each of the pure wooden boards (1) has laminating sides; the laminating sides of each of the pure wooden boards (1) are each provided with an expansion joint (11) and a plurality of screw holes, and adhesive is applied to the laminating sides; the pure wooden boards (1) are aligned and laminated to form into an integrated pure wooden laminated board assembly (10); the screws (4) are engaged with the respective screw holes of each of the pure wooden boards (1) respectively, and two ends of the screws (4) are fastened and locked by the respective nuts (5); the first pure wooden side board (2) and the second pure wooden side board (3) are provided on the laminating sides at two sides of the pure wooden laminated board assembly (10) respectively, so that ends of the screws (4) and the nuts (5) are concealed inside the pure wooden laminated board; two sides of the aluminium alloy male baseplate (7) are respectively provided with a male connector portion (20) and a female joint portion (60); two sides of the aluminium alloy female baseplate (8) are respectively provided with a female connector portion (30) and a male joint portion (70); the male connector portion (20) of the aluminium alloy male baseplate (7) is engaged with the female connector portion (30) of the adjacent aluminium alloy female baseplate (8); the female joint portion (60) of the aluminium alloy male baseplate (7) is engaged with the male joint portion (70) of the adjacent aluminium alloy female baseplate (8); each of the pure wooden laminated boards is fixedly covered on the aluminium alloy male baseplate (7) and the aluminium alloy female baseplate (8) respectively; a male connector head (40) and a female connector head (50) which can be engaged with each other are provided at two ends of each of the pure wooden laminated boards respectively.

5. The aluminium-wood composite laminated board device as in claim 4, characterized in that at least one aluminium alloy expansion baseplate (9) is provided between the female joint portion (60) of the aluminium alloy male baseplate (7) and the male joint portion (70) of the adjacent aluminium alloy female baseplate (8); a male joint portion (70) is provided at one side of the aluminium alloy expansion baseplate (9), and a female joint portion (60) is provided at another side of the aluminium alloy expansion baseplate (9); the male joint portion (70) at one side of the aluminium alloy expansion baseplate (9) is engaged with the female joint portion (60) of the aluminium alloy male baseplate (7); the female joint portion (60) at one side of the aluminium alloy expansion baseplate (9) is engaged with the male joint portion (70) of the aluminium alloy female baseplate (8); the pure wooden laminated boards are fixedly covered on the aluminium alloy expansion baseplate (9), and adhesive is applied on contact surfaces between the pure wooden laminated boards and the aluminium alloy expansion baseplate (9).

6. The aluminium-wood composite laminated board device as in claim 4, characterized in that the male connector head (40) and the male connector portion (20) respectively comprise a notch (100) and two assembly strips (200) provided in the notch (100); the female connector head (50) and the female connector portion (30) respectively comprise an assembly slot (300) and an assembly portion (400) provided in the assembly slot (300).

7. The aluminium-wood composite laminated board device as in claim 4, characterized in that an expansion joint (600) is provided between the pure wooden laminated boards and the aluminium alloy baseplate (6), and adhesive is applied on contact surfaces between the pure wooden laminated boards and the aluminium alloy baseplate (6).

8. The aluminium-wood composite laminated board device as in claim 4, characterized in that the male joint portion (70) comprises a slot (701) and a jointing strip (702) provided beside the slot (701); the female joint portion (60) comprises a jointing slot (601) and a jointing portion (602) provided beside the jointing slot (601).

\* \* \* \* \*